(12) United States Patent
Ma

(10) Patent No.: US 8,870,584 B2
(45) Date of Patent: Oct. 28, 2014

(54) CARD CONNECTOR WITH BUFFERING MEMBER FOR PREVENTING CARD FROM QUICKLY EJECTING

(71) Applicant: Kunshan Jiahua Electronics Co., Ltd., Kunshan (CN)

(72) Inventor: Fei-Song Ma, Kunshan (CN)

(73) Assignee: Kunshan Jiahua Electronics Co., Ltd., Kunshan, Jiangsu Province (CN)

( * ) Notice: Subject to any disclaimer, the term of this patent is extended or adjusted under 35 U.S.C. 154(b) by 2 days.

(21) Appl. No.: 13/870,964

(22) Filed: Apr. 25, 2013

(65) Prior Publication Data

US 2013/0288496 A1  Oct. 31, 2013

(30) Foreign Application Priority Data

Apr. 25, 2012 (CN) .......................... 2012 1 0123690
Apr. 25, 2012 (CN) .......................... 2012 1 0123695

(51) Int. Cl.
*H01R 13/62* (2006.01)
*G06K 13/08* (2006.01)
*H01R 13/633* (2006.01)

(52) U.S. Cl.
CPC .......... *H01R 13/633* (2013.01); *G06K 13/0812* (2013.01)
USPC ......................................... 439/159; 439/631

(58) Field of Classification Search
USPC .................................................. 439/159, 631
See application file for complete search history.

(56) References Cited

U.S. PATENT DOCUMENTS

| | | | |
|---|---|---|---|
| 7,118,394 B2 * | 10/2006 | Yoneyama et al. ............ | 439/159 |
| 7,182,613 B2 * | 2/2007 | Xu et al. ........................ | 439/159 |
| 7,255,604 B2 * | 8/2007 | Tanaka et al. ................. | 439/630 |
| 7,491,074 B1 * | 2/2009 | Lai ................................ | 439/159 |
| 7,517,238 B2 * | 4/2009 | Ting ......................... | 439/607.01 |
| 8,231,395 B2 * | 7/2012 | Li ................................. | 439/159 |
| 8,246,366 B2 * | 8/2012 | Tsai et al. ...................... | 439/159 |
| 2005/0208805 A1 * | 9/2005 | Kodera et al. ................. | 439/159 |
| 2011/0003496 A1 * | 1/2011 | Hu ................................. | 439/159 |
| 2013/0065411 A1 * | 3/2013 | Tsuji et al. .................... | 439/152 |

\* cited by examiner

*Primary Examiner* — Briggitte R Hammond
(74) *Attorney, Agent, or Firm* — Cheng-Ju Chiang

(57) ABSTRACT

A card connector includes an insulative housing with a first card receiving space, a number of first contacts extending into the first card receiving space, a push-push mechanism and a stop wall. The push-push mechanism includes a slider, an elastic member for urging the slider and a locking arm fixed to the slider. The locking arm includes a hook for locking a first card and a resilient buffering member protruding forwardly beyond the slider. The stop wall is located adjacent to an insertion opening of the first card receiving space. The stop wall is capable of resisting against the resilient buffering member so as to slow down the first card when the first card is quickly ejected along the card extraction direction. As a result, the first card can be prevented from flying off the card connector.

20 Claims, 11 Drawing Sheets

CARD CONNECTOR WITH BUFFERING MEMBER FOR PREVENTING CARD FROM QUICKLY EJECTING

BACKGROUND OF THE INVENTION

1. Field of the Invention

The present invention relates to a card connector, and more particularly to a card connector with a buffering member for preventing a card from flying off the card connector when the card is quickly ejected.

2. Description of Related Art

Card connectors are usually mounted on PCBs of electronic devices to establish data transmission between the cards and the electronic devices. A conventional card connector includes an insulative housing, a plurality of contacts fixed in the insulative housing, a push-push mechanism operated by the card and a shell covering the insulative housing. The insulative housing and the shell cooperatively form a card-receiving space for accommodating the card. The push-push mechanism includes a slider moveable along a card insertion/ejection direction, a spring compressed between the slider and the insulative housing and a locking arm retained on the slider for holding the card. The card is capable of being inserted into or ejected from the card connector through the push-push mechanism.

When the card is ejected from the card connector, the locking arm locks the card so that the card can be stably ejected therefrom under normal ejecting speed. However, since there is no buffering member set on the card connector, the card might fly off the card connector when it is ejected from the card connector under rapid ejecting speed. Besides, without any buffering member, when the card is ejected rapidly, the locking arm might be crushed by the card because of big impact force therebetween.

In order to solve the above problems, a buffering mechanism is provided by the card connector for reducing the ejecting speed of the card. However, the conventional buffering mechanism is either independently or additionally arranged on the card connector which will greatly complicate the structure and manufacturing process of the card connector and accordingly result in high cost.

Hence, a card connector with an improved buffering member is desired.

BRIEF SUMMARY OF THE INVENTION

The present invention provides a card connector having a first card receiving space for receiving a first card. The card connector includes an insulative housing, a plurality of first contacts fixed in the insulative housing, a push-push mechanism and a stop wall for mating with the push-push mechanism. Each first contact includes a first contacting portion extending into the first card receiving space. The push-push mechanism includes a slider slidably along a card insertion direction or a card extraction direction, an elastic member for urging the slider and a locking arm fixed to the slider. The locking arm includes a hook protruding into the first card receiving space and a resilient buffering member protruding forwardly beyond the slider. The stop wall is located adjacent to an insertion opening of the first card receiving space. The stop wall is capable of resisting against the resilient buffering member so as to slow down the first card when the first card is quickly ejected along the card extraction direction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The components in the drawing are not necessarily drawn to scale, the emphasis instead being placed upon clearly illustrating the principles of the described embodiments. In the drawings, reference numerals designate corresponding parts throughout various views, and all the views are schematic.

DETAILED DESCRIPTION OF THE PREFERRED EMBODIMENTS

Figure 1:
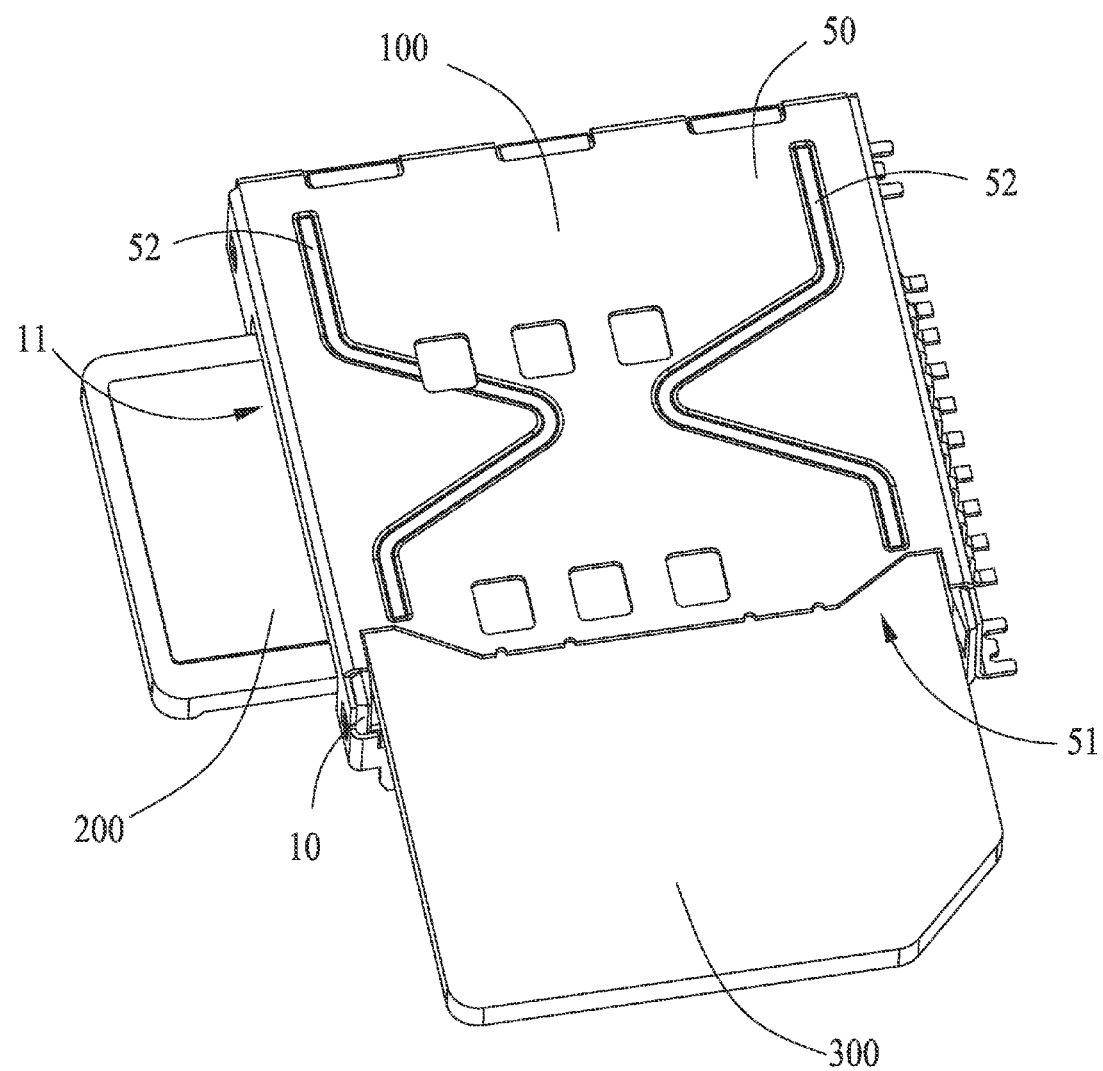
FIG. 1 is a perspective view of a card connector with first and second cards inserted therein in accordance with a first illustrated embodiment of the present invention.

Reference will now be made to the drawing figures to describe the embodiments of the present invention in detail. In the following description, the same drawing reference numerals are used for the same elements in different drawings.

Figure 2:
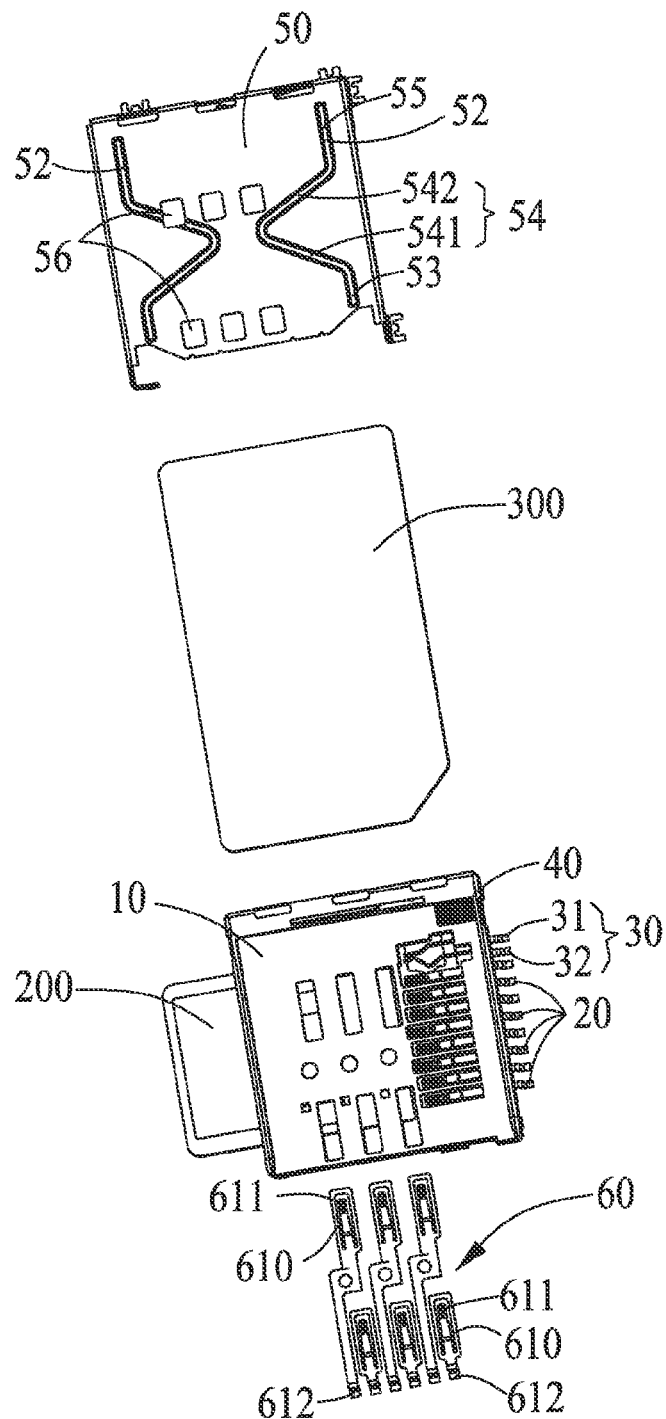
FIG. 2 is a partly exploded view of the card connector as shown in FIG. 1.
Figure 3:
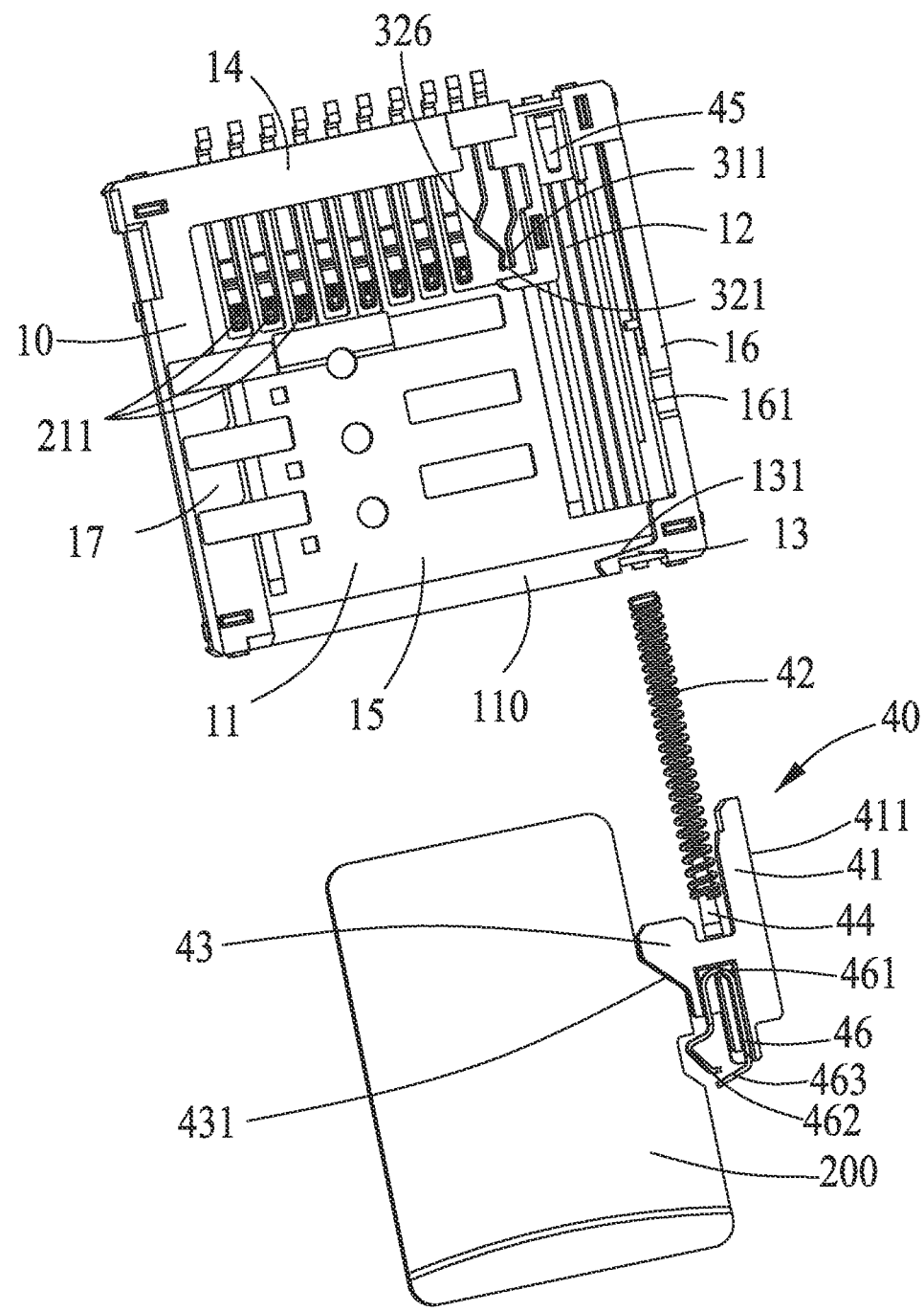
FIG. 3 is a partly exploded view of the card connector with a push-push mechanism and a first card separated therefrom.

Referring to FIGS. 1 to 3, the present invention discloses a card connector 100 for insertion of a first card 200 (i.e. a Micro SD card) and a second card 300 (i.e. a SIM card). The card connector 100 includes an insulative housing 10, first and second groups of contacts fixed in the insulative housing 10, a group of switch contacts 30, a push-push mechanism 40 moveably mounted on the insulative housing 10 and a metal shell 50 covering the insulative housing 10. The first group of contacts includes a plurality of first contacts 20. The second group of contacts includes a plurality of second contacts 60. The group of switch contacts 30 includes a first switch contact 31 and a second switch contact 32 in a side-by-side arrangement. The first switch contact 31 and the second switch contact 32 are normally open and are in contact with each other with suitable insertion of the first card 200. According to the illustrated embodiment of the present invention, the insulative housing 10 defines a first card receiving space 11 for accommodating the first card 200. The metal shell 50 cooperatively with the insulative housing 10 to form a second card receiving space 51 for receiving the second card 300. The first card receiving space 11 and the second card receiving space 51 are stackable along a vertical direction for respectively receiving the first card 200 and the second card 300 along perpendicular horizontal directions.

Figure 4:
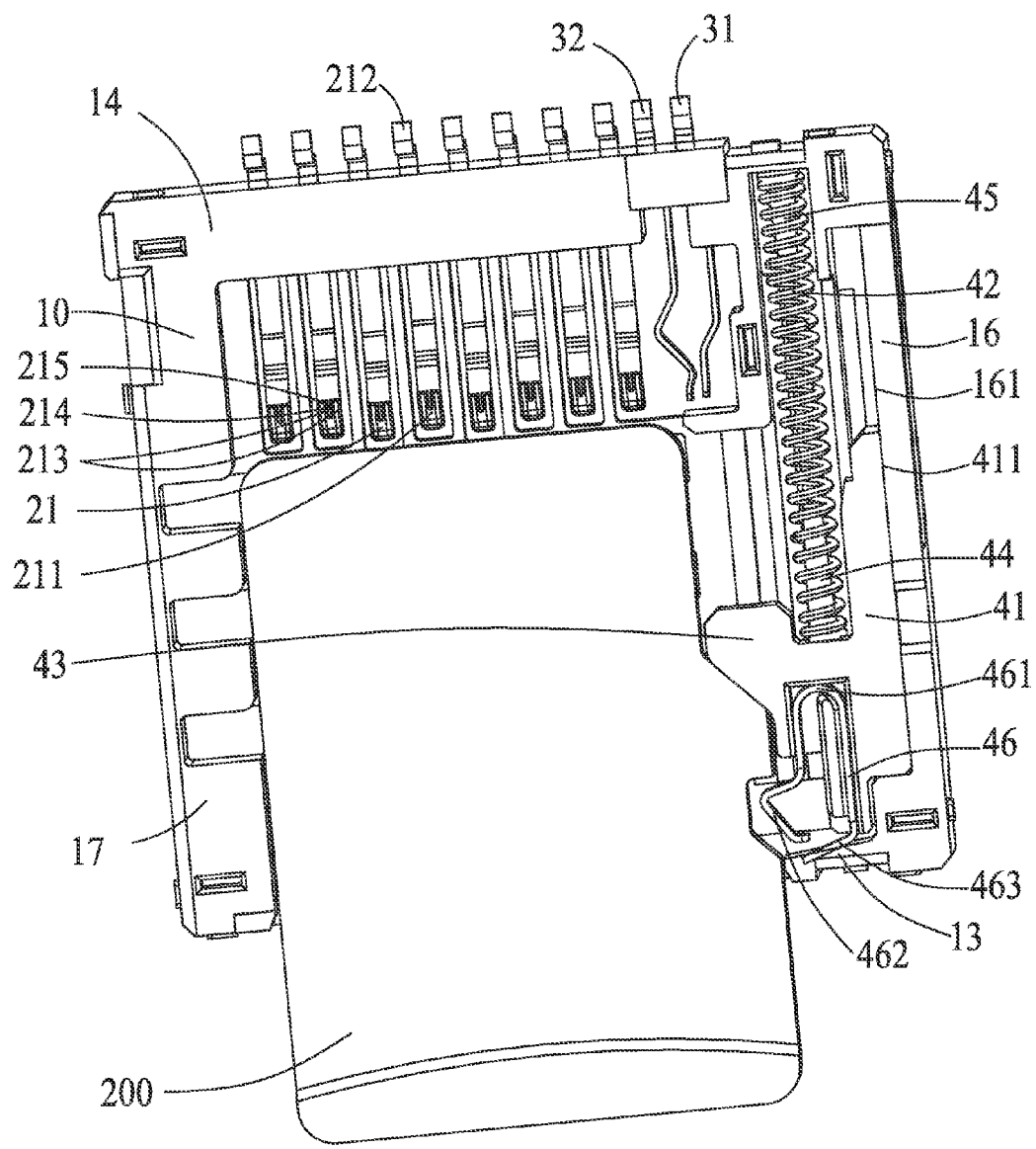
FIG. 4 is a partly perspective view of the card connector as shown in FIG. 3 with the first card initially inserted therein.

Referring to FIGS. 3 and 4, the insulative housing 10 includes a rear wall 14, a bottom wall 15, a first side wall 16 and a second side wall 17. The first card receiving space 11 is formed by the rear wall 14, the bottom wall 15 and the side walls 16, 17. The first side wall 16 includes a receiving room 12 at a lateral side of the first card receiving space 11 for accommodating the push-push mechanism 40. According to the illustrated embodiment of the present invention, the first card receiving space 11 and the receiving room 12 are neighboring and in communication with each other. The first side wall 16 includes a first guiding surface 161 exposed in the receiving room 12 for guiding movement of the push-push mechanism 40. Besides, the card connector 100 is provided with a stop wall 13 located adjacent to an insertion opening 110 of the first card receiving space 11. The stop wall 13 includes an inclined surface 131 obliquing towards the insertion opening 110 for engaging with the push-push mechanism 40. According to the illustrated embodiment of the present invention, the stop wall 13 is integrally formed with the insulative housing 10 and is located at a front corner of the insulative housing 10.

Referring to FIGS. 2 to 5, the first contacts 21 are fixed in the rear wall 14 of the insulative housing 10. Each first contact 21 includes a first contacting portion 211 extending into the first card receiving space 11 for mating with the first card 200 and a first soldering tail 212 extending beyond the rear wall 14 for soldering to a PCB. Each first contacting portion 211 includes a pair of raised portions 213 and a slot 214 formed by the raised portions 213. Each raised portion 213 includes a knife edge 215 for wiping the first card 200 so that robust electrically connection between the first card 200 and the first contacting portions 211 can be realized. The slot 214 is adapted for collecting wiping fragments.

The second contacts 60 are divided into two rows according to different lengths. Each second contact 60 includes a rectangular frame 610, a second contacting portions 611 stamped from the rectangular frame 610 and extending into the second card receiving space 51, and a second soldering tail 612 for soldering to the PCB.

Figure 6:
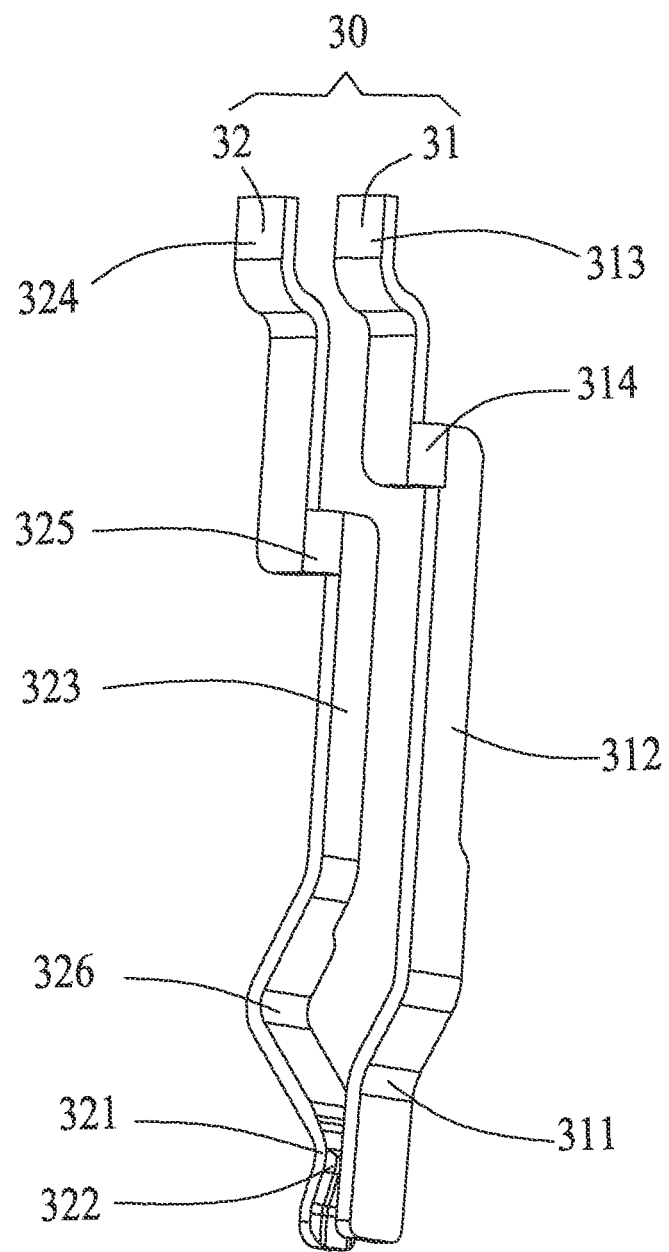
FIG. 6 is a perspective view of first and second switch contacts of the card connector.
Figure 7:
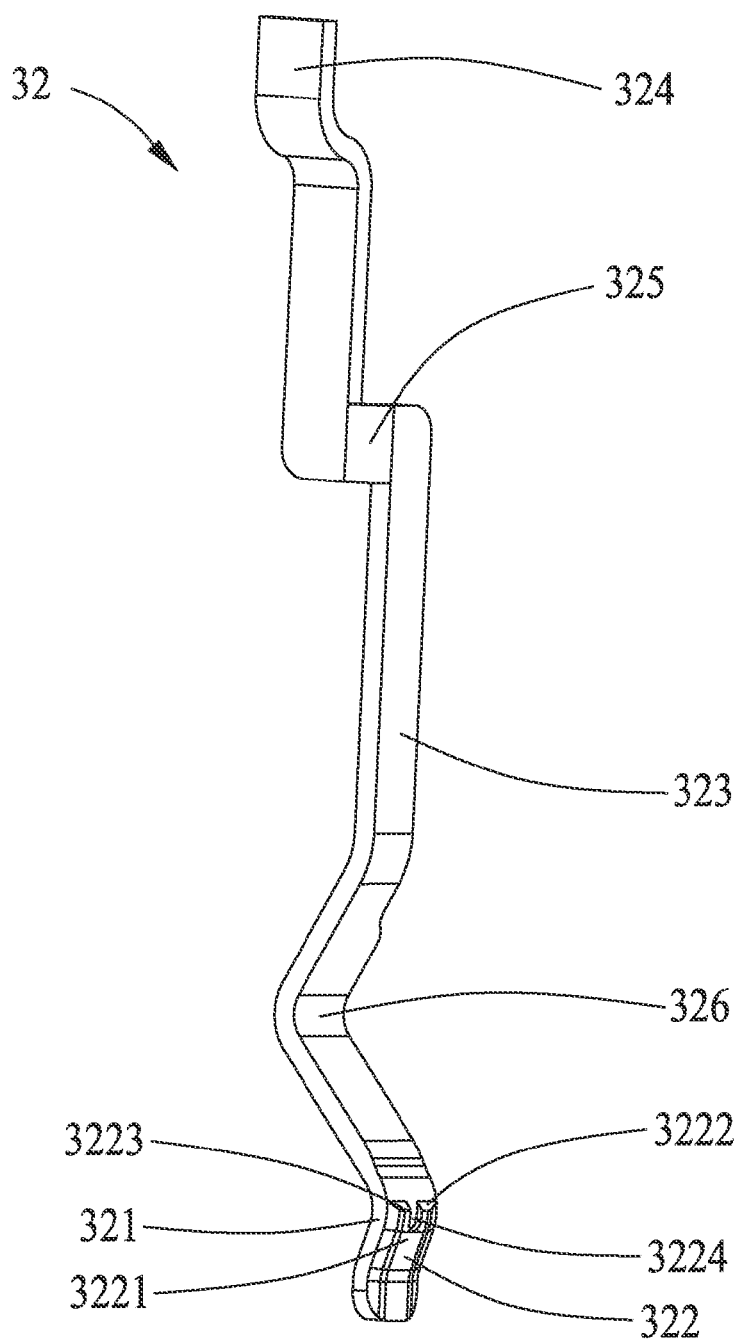
FIG. 7 is a perspective view of the second switch contact.
Figure 8:
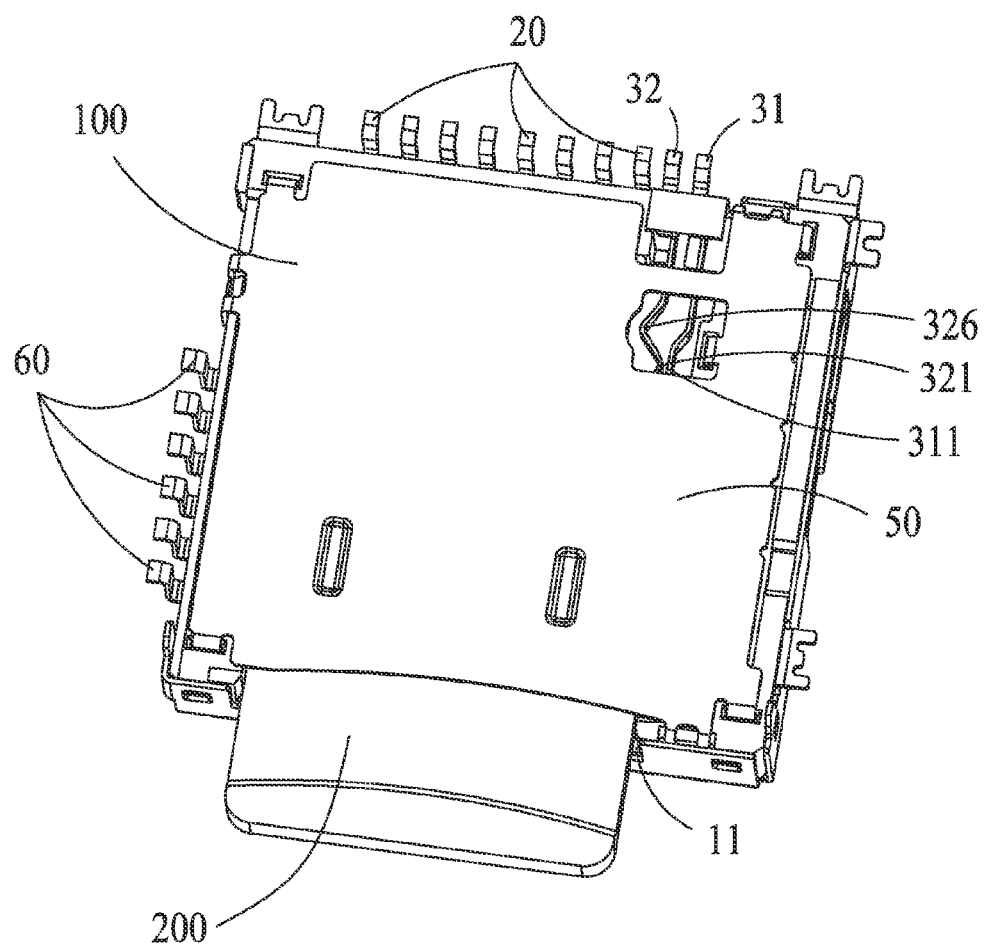
FIG. 8 is a perspective view of another card connector with a first card inserted therein in accordance with a second illustrated embodiment of the present invention.
Figure 9:
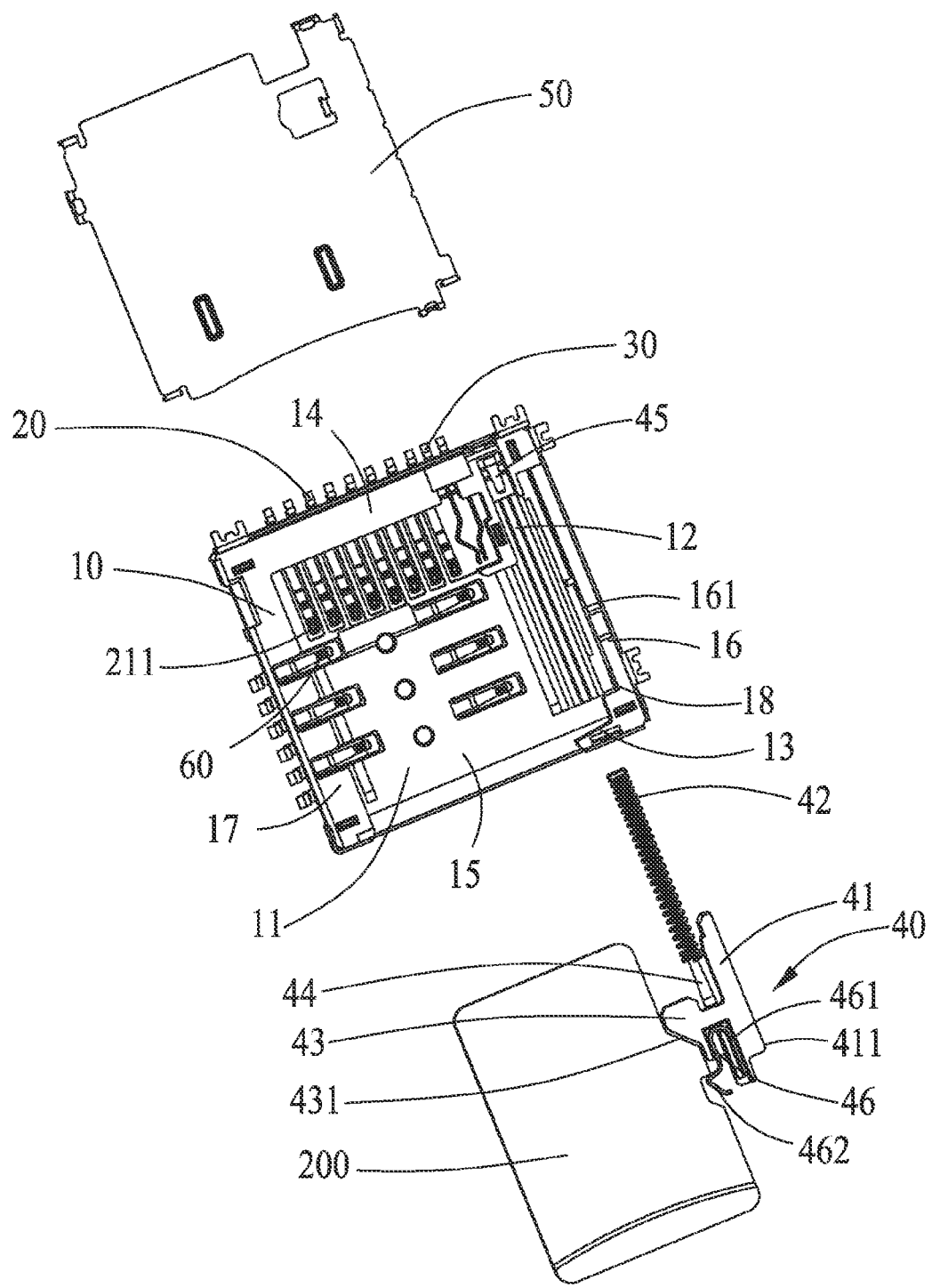
FIG. 9 is a partly exploded view of the card connector as shown in FIG. 8.
Figure 10:
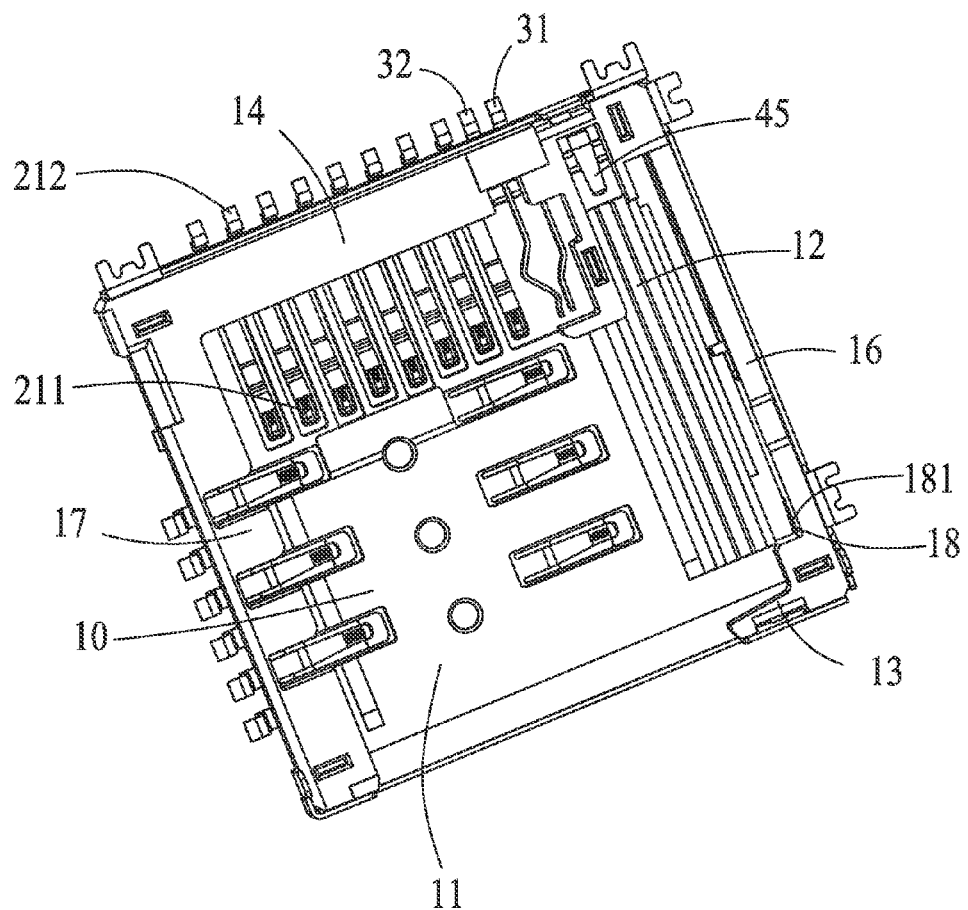
FIG. 10 is a partly perspective view of the card connector as shown in FIG. 9 with contacts fixed in an insulative housing.
Figure 11:
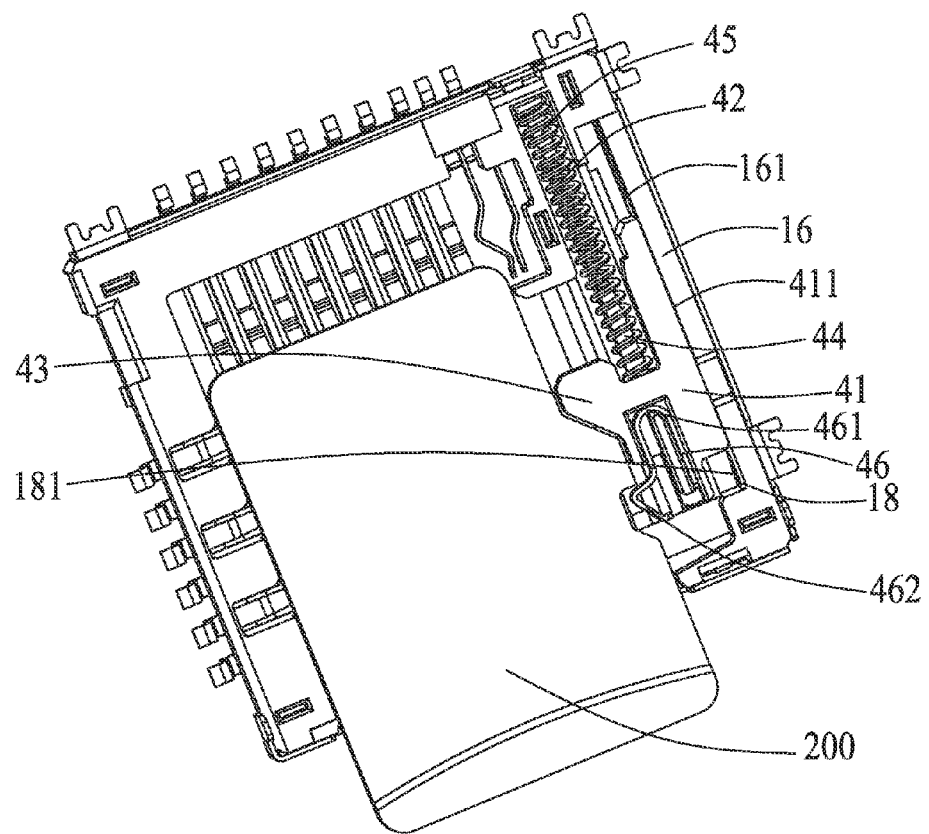
FIG. 11 is a perspective view of the card connector as shown in FIG. 9 with the first card inserted therein.

Referring to FIGS. 6 and 7, the first switch contact 31 includes a first base 312 retained in the insulative housing 10, a first contact section 311 extending forwardly from the first base 312 and bent towards the second switch contact 32, a first bent section 314 extending sidewardly from an edge of the first base 312, a first tail 313 extending backwardly from the first bent section 314 for soldering to the PCB. The first base 312 is located in a vertical plane and the first bent section 314 is essentially perpendicular to the first base 312.

The second switch contact 32 includes a second base 323 retained in the insulative housing 10, an engaging section 326 extending forwardly from the second base 323, a second contact section 321 extending forwardly from the engaging section 326, a second bent section 325 extending sidewardly from an edge of the second base 323, a second tail 324 extending backwardly from the second bent section 325 for soldering to the PCB. The second base 323 is located in the vertical plane and the second bent section 325 is essentially perpendicular to the second base 323. The engaging section 326 is bent opposite to the first switch contact 31 for being driven by the first card 200. The second contact section 321 is bent towards the first contact section 311. The second contact section 321 further includes a wiping block 322 formed thereon for wiping the first contact section 311 so as to remove insulative matter (i.e. dust) during the first card 200 inserted into the first card receiving space 11.

Referring to FIG. 7, the wiping block 322 includes a contacting surface 3221 for selectively engaging with the first contact section 311, a rear oblique surface 3222, a knife edge 3223 formed at a boundary of the rear oblique surface 3222 and the contacting surface 3221, and a slot 3224 extending through the rear oblique surface 3222. As a result, from an integral view, the wiping block 322 is U-shaped and includes a pair of sidewardly raised portions with the slot 3224 formed therebetween. The slot 3224 is adapted for collecting wiping fragments. In such arrangement, when the first card 200 is inserted, because of the wiping action between the first switch contact 31 and the second switch contact 32, accurate detection about insertion of the first card 200 can be realized.

Referring to FIGS. 3 and 4, the push-push mechanism 40 includes a slider 41 slidably along a card insertion direction or a card extraction direction, an elastic member 42 for urging the slider 41 and a locking arm 46 fixed to the slider 41. The slider 41 includes a second guiding surface 411 for mating with the first guiding surface 161 and a resisting portion 43 for engaging with the first card 200. The resisting portion 43 includes a slant surface 431 for mating with the first card 200 so that the slider 41 can move forwardly under the drive of the first card 200. Besides, the slider 41 includes a first post 44 for positioning one end of the elastic member 42. The insulative housing 10 includes a second post 45 for positioning the other end of the elastic member 42. The elastic member 42 is thereby compressed between the rear wall 14 and the slider 41 as shown in FIG. 4.

The locking arm 46 includes a U-shaped fixing portion 461 retained in the slider 41, a V-shaped hook 462 extending from a first branch of the U-shaped fixing portion 461 and a resilient buffering member extending from a second branch of the U-shaped fixing portion 461. The hook 462 protrudes into the first card receiving space 11 for locking with the first card 200. According to the illustrated embodiment of the present invention, the resilient buffering member includes an inclined arm 463 extending towards the hook 462 and the stop wall 13. The inclined arm 463 includes a free end adjacent to the hook 462. The inclined arm 463 is located at a front of the hook 462 and is separated a distance from the hook 462 along the card insertion direction. The free end extends beyond a distal end of the hook 462 along a transverse direction perpendicular to the card insertion direction. The inclined arm 463 has a slope larger than the inclined surface 161 of the stop wall 13. The inclined surface 161 is capable of resisting against the inclined arm 463 so as to slow down the first card 200 when the first card 200 is ejected quickly along the card extraction direction. As a result, the first card 200 can be prevented from flying off the card connector 100. Besides, with the inclined arm 463 integrally formed with the locking arm 46, the resilient buffering member according to the first illustrated embodiment of the present invention can be simplified.

Figure 5:
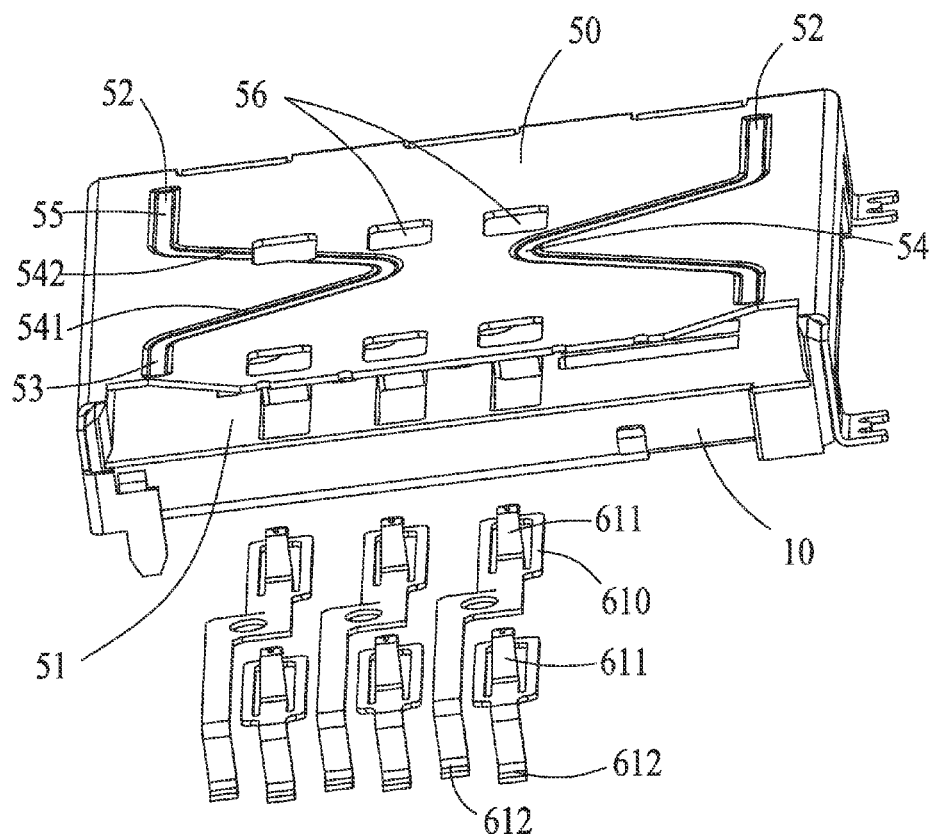
FIG. 5 is a partly exploded view of the card connector with a second contact group separated therefrom.

Referring to FIGS. 2 and 5, the metal shell 50 includes a pair of first and second ribs 52 stamped inwardly into the second card receiving space 51 for stably holding the second card 300 along the vertical direction. The first and the second ribs 52 are symmetrical with each other. Each of the first and the second ribs 52 includes a first protrusion 53, a second protrusion 55 and a V-shaped protrusion 54 connected between the first protrusion 53 and the second protrusion 55. The first protrusion 53 and the second protrusion 55 are in alignment with each other along an insertion direction of the second card 300. The V-shaped protrusion 54 includes a first oblique protrusion 541 connected to the first protrusion 53 and a second oblique protrusion 542 connected to the second protrusion 55. The first protrusion 53 is located adjacent to a front opening of the second card receiving space 51 so that when the second card 300 is inserted into the second card receiving space 51, on one hand, the second card 300 cannot be injured or stopped by a front edge of the metal shell 50, and on the other hand, the second card 300 can be easily inserted under the guidance of the first protrusions 53. Besides, the metal shell 50 includes a plurality of holes 56 corresponding to the second contacting portions 611 of the second contacts 60. Through such holes 56, the mating status of the second contacting portions 611 and the second card 300 can be clearly observed.

Referring to FIGS. 8 to 11, according to a second illustrated embodiment of the present invention, the locking arm 46 is not provided with the inclined arm 463 as shown in FIGS. 3 and 4 of the first embodiment. Instead, the electrical connector 100 of the second embodiment further includes a block 18 protruding inwardly beyond the first guiding surface 161 and towards the receiving room 12. The block 18 is capable of resisting against the second guiding surface 411 of the slider 41 so as to slow down the first card 200 when the first card 200 is ejected along the card extraction direction. As a result, the first card 200 can also be prevented from flying off the card connector 100. The block 18 includes an inclined buffering surface 181 to resist against the second guiding surface 411 of the slider 41 when the first card 200 is quickly ejected along the card extraction direction. The block 18 is gradually widening along the card extraction direction. According to the illustrated embodiment of the present invention, the block 18 is integrally formed on the first guiding surface 161 of the first side wall 16 for simplifying structure and saving costs. The first guiding surface 161 and the second guiding surface 411 are vertical surfaces, and the block 18 is located at a most significant end of the first guiding surface 161.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broadest general meaning of the terms in which the appended claims are expressed.

What is claimed is:

1. A card connector having a first card receiving space for receiving a first card, comprising:
    an insulative housing;
    a plurality of first contacts fixed in the insulative housing, each first contact comprising a first contacting portion extending into the first card receiving space;
    a push-push mechanism comprising a slider slidably along a card insertion direction or a card extraction direction, an elastic member for urging the slider and a locking arm fixed to the slider, the locking arm comprising a hook protruding into the first card receiving space and a resilient buffering member protruding forwardly beyond the slider; and
    a stop wall located adjacent to an insertion opening of the first card receiving space, the stop wall being capable of resisting against the resilient buffering member so as to slow down the first card when the first card is ejected along the card extraction direction.

2. The card connector as claimed in claim 1, wherein the resilient buffering member comprises an inclined arm extending towards the hook and the stop wall, the inclined arm comprising a free end adjacent to the hook.

3. The card connector as claimed in claim 2, wherein the inclined arm is located at a front of the hook and is separated a distance from the hook along the card insertion direction, the free end extending beyond a distal end of the hook along a transverse direction perpendicular to the card insertion direction.

4. The card connector as claimed in claim 2, wherein the locking arm comprises a U-shaped fixing portion retained in the slider, the hook extending from a first branch of the U-shaped fixing portion, the inclined arm extending from a second branch of the U-shaped fixing portion.

5. The card connector as claimed in claim 2, wherein the stop wall comprises an inclined surface for resisting against the inclined arm, the inclined arm having a slope larger than the inclined surface.

6. The card connector as claimed in claim 1, wherein the stop wall is integrally formed with the insulative housing.

7. The card connector as claimed in claim 1, wherein the insulative housing comprises a rear wall, a bottom wall and a pair of first and second side walls with the first card receiving space jointly formed thereby, the first contacts being fixed in the rear wall, the first side wall comprising a receiving room at a lateral side of the first card receiving space to accommodate the push-push mechanism, the elastic member being compressed between the rear wall and the slider.

8. The card connector as claimed in claim 1, wherein each first contacting portion comprises a pair of raised portions and a slot formed by the raised portions, each raised portion comprising a knife edge for wiping the first card, the slot being adapted for collecting wiping fragments.

9. The card connector as claimed in claim 1, further comprising a metal shell covering the insulative housing and together form a second card receiving space for receiving a second card, the card connector comprising a plurality of second contacts each of which comprises a second contacting portion extending into the second card receiving space, the first card receiving space and the second card receiving space being stackable along a vertical direction for respectively receiving the first card and the second card along perpendicular horizontal directions.

10. The card connector as claimed in claim 9, wherein the metal shell comprises a pair of first rib and second rib stamped inwardly into the second card receiving space, the first rib and the second rib being symmetrical with each other, each of the first rib and the second rib comprising a first protrusion, a second protrusion and a V-shaped protrusion connected between the first protrusion and the second protrusion, the first protrusion and the second protrusion being in alignment with each other along an insertion direction of the second card.

11. A card connector comprising:
    an insulative housing comprising a first card receiving space for receiving a first card and a first side wall neighboring the first card receiving space, the first side wall comprising a receiving room at a lateral side of the first card receiving space and a first guiding surface exposed in the receiving room;
    a plurality of first contacts fixed in the insulative housing, each first contact comprising a first contacting portion extending into the first card receiving space;
    a push-push mechanism received in the receiving room and comprising a slider slidably along a card insertion direction or a card extraction direction, an elastic member abutting against the slider and a locking arm protruding into the first card receiving space for locking with the first card, the slider comprising a second guiding surface for mating with the first guiding surface; and
    a block protruding inwardly beyond the first guiding surface and towards the receiving room, the block being capable of resisting against the second guiding surface of the slider so as to slow down the first card when the first card is ejected along the card extraction direction.

12. The card connector as claimed in claim 11, wherein the block comprising an inclined buffering surface to resist against the second guiding surface of the slider when the first card is quickly ejected along the card extraction direction.

13. The card connector as claimed in claim 12, wherein the block is gradually widening along the card extraction direction.

14. The card connector as claimed in claim 11, wherein the block is integrally formed on the first guiding surface of the first side wall.

15. The card connector as claimed in claim 11, wherein the first guiding surface and the second guiding surface are vertical surfaces, and the block is located at a most significant end of the first guiding surface.

16. The card connector as claimed in claim 11, wherein the locking arm comprises a U-shaped fixing portion retained in the slider with the hook extending from the U-shaped fixing portion.

17. The card connector as claimed in claim 11, wherein the insulative housing comprises a rear wall, a bottom wall and a second side wall opposite to the first side wall, the first card receiving space being formed between the first side wall and the second side wall, the first contacts being fixed in the rear wall, the elastic member being compressed between the rear wall and the slider.

18. The card connector as claimed in claim 11, further comprising a pair of first and second switch contacts at a lateral side of the first contacts, the first switch contact comprising a first contact section, the second switch contact comprising a second contact section which selectively engages or disengages with the first contact section, the second contact section comprising a wiping block which comprises a knife edge for wiping the first contact section so as to remove insulative matter.

19. The card connector as claimed in claim 18, wherein the wiping block comprises a contacting surface for engaging with the first contact section, a rear oblique surface and a slot extending through the rear oblique surface for collecting wiping fragments.

20. The card connector as claimed in claim 19, wherein the knife edge is formed at a boundary of the rear oblique surface and the contacting surface.

\* \* \* \* \*